US008636286B2

(12) United States Patent
Vik

(10) Patent No.: US 8,636,286 B2
(45) Date of Patent: Jan. 28, 2014

(54) PRESS-FIT FACE SEAL FOR USE WITH WHEEL ASSEMBLY

(75) Inventor: Brian D. Vik, Barnesvile, MN (US)

(73) Assignee: CNH America LLC, New Holland, PA (US)

( * ) Notice: Subject to any disclaimer, the term of this patent is extended or adjusted under 35 U.S.C. 154(b) by 251 days.

(21) Appl. No.: 12/975,612

(22) Filed: Dec. 22, 2010

(65) Prior Publication Data

US 2012/0161500 A1    Jun. 28, 2012

(51) Int. Cl.
*F16J 15/34* (2006.01)

(52) U.S. Cl.
USPC .......................................................... 277/370

(58) Field of Classification Search
CPC .... F16J 15/3464; F16J 15/348; F16J 15/3444
USPC .......... 277/370, 377–380, 381, 383, 389, 572
See application file for complete search history.

(56) References Cited

U.S. PATENT DOCUMENTS

| | | | |
|---|---|---|---|
| 2,341,900 A | 2/1944 | Boden | |
| 2,576,673 A | 11/1951 | Cole | |
| 3,241,844 A * | 3/1966 | Morley | 277/370 |
| 3,250,540 A | 5/1966 | Christensen et al. | |
| 3,272,519 A | 9/1966 | Voitik | |
| 3,279,804 A | 10/1966 | Blair | |
| 3,940,154 A * | 2/1976 | Olsson | 277/381 |
| 3,985,366 A | 10/1976 | Plouzek | |
| 4,216,972 A | 8/1980 | Domes et al. | |
| 4,256,315 A * | 3/1981 | Larson et al. | 277/381 |
| 4,822,057 A * | 4/1989 | Chia et al. | 277/383 |
| 5,018,749 A * | 5/1991 | Forch | 277/387 |
| 6,814,668 B2 * | 11/2004 | Grupido | 464/133 |
| 7,370,865 B2 * | 5/2008 | Vik et al. | 277/380 |
| 7,854,434 B2 * | 12/2010 | Heiman et al. | 277/644 |
| 2002/0105147 A1* | 8/2002 | Zutz | 277/380 |
| 2004/0256808 A1* | 12/2004 | Tsuboi et al. | 277/377 |

FOREIGN PATENT DOCUMENTS

| | | | |
|---|---|---|---|
| DE | 4005721 A1 | 9/1991 | |
| JP | 56164280 A | 12/1981 | |

\* cited by examiner

*Primary Examiner* — Vishal Patel
*Assistant Examiner* — Nathan Cumar
(74) *Attorney, Agent, or Firm* — Sue C. Watson

(57) ABSTRACT

A face seal comprises a first half and a second half. Each half of the face seal comprises an inner sealing ring, the inner sealing ring being generally L-shaped in cross-section, an elastomer ring disposed over the inner sealing ring, and an outer ring disposed over the elastomeric ring, the outer ring being generally Z-shaped in cross-section. The inner sealing ring comprises an axially extending circular cylindrical portion, a radially extending planar ring portion coupled to the cylindrical portion, and a sealing surface defined by the seal side planar wall. The outer ring comprises an axially extending second circular cylindrical portion, a seating flange extending radially outward from a front end of the second cylindrical portion, and a backing flange extending radially inward from the rear end of the second cylindrical portion.

18 Claims, 7 Drawing Sheets

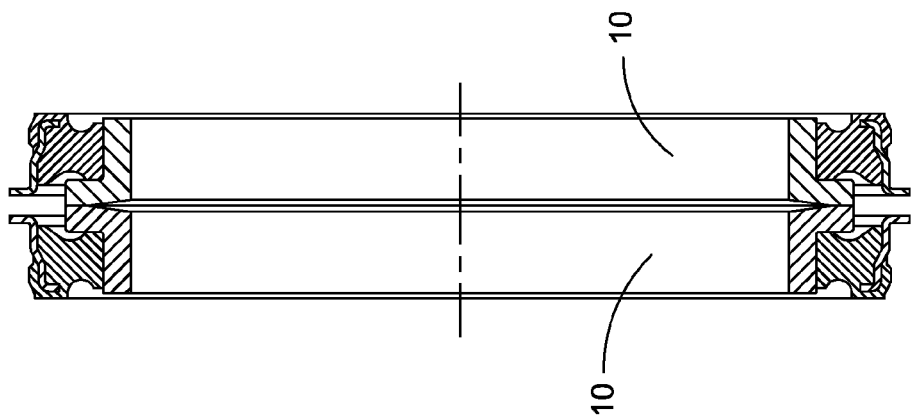
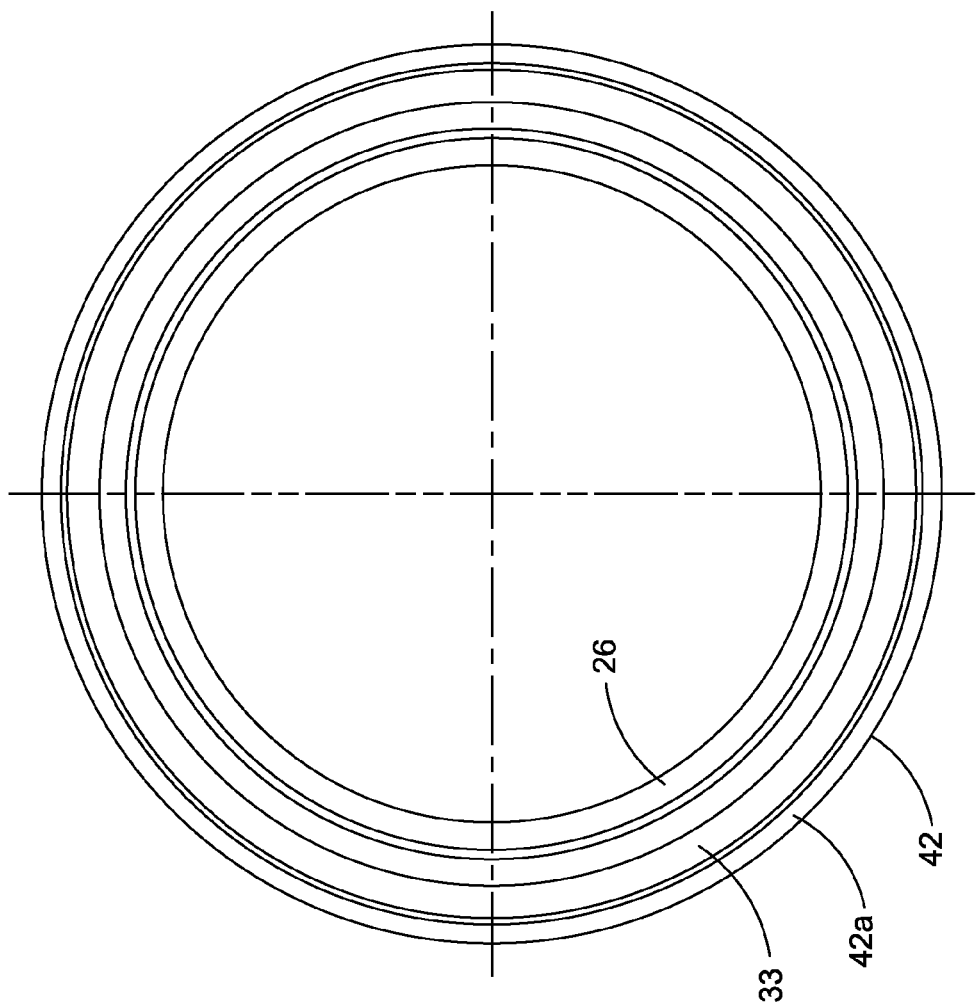

PRESS-FIT FACE SEAL FOR USE WITH WHEEL ASSEMBLY

TECHNOLOGY FIELD

The present invention relates generally to seals for rotating shafts, and more particularly to a face seal with an integrally bonded outer ring. Embodiments of the face seal with an integrally bonded outer ring are particularly well suited, but in no way limited to, use in track roller assemblies and track idler wheel assemblies of rubber-tracked vehicles.

BACKGROUND

Axial face seals (or "face seals") are used to seal two relatively rotating bodies against each other. Face seals keep dirt and other contamination from reaching sensitive parts of a machine, such as bearings, and to retain fluid within a fluid-filled housing.

Face seals are designed to be mounted and assembled as pairs in a face-to-face relationship with the two sealing rings (typically highly polished metal rings) facing each other and rotating relative to each other. Two-piece seals are considered to be particularly susceptible to misassembly, misalignment, wear and damage because the two sealing rings, both being made of metal, are prone to wear and overheating.

Face seals may be used with rubber-tracked vehicles having high travel speed, which produces high face seal temperature due to circumferential face speed. For example, the larger the seal, the larger the circumference and hence face speed, and therefore higher temperature for a given vehicle speed. Wear and overheating may be heightened in applications involving vehicles having high travel speeds.

Rubber-tracked vehicles may also experience high tractive effort and track tension. High tractive effort and high pre-load track tension place a large load on the bearings of the idler wheels. As such, large, high-capacity bearings are required. In turn, larger circumference face seals are also required for such applications.

Further, due to design constraints conventional face seal designs utilize a seal which is substantially larger than the bearing. This phenomenon is illustrated in FIG. 7 of U.S. Pat. No. 7,370,865, for example, which shows a conventional wheel assembly having a face seal 102 that is substantially larger than the bearing 190.

Accordingly, design constraints dictate a larger bearing with a smaller face seal, thereby reducing heat produced by the face seal during operation while still limiting any tension and reaction forces applied to the bearings.

SUMMARY

According to a first embodiment of the invention, a face seal comprises a first half and a second half. Each half of the face seal comprises an inner sealing ring, the inner sealing ring being generally L-shaped in cross-section, an elastomer ring disposed over the inner sealing ring, and an outer ring disposed over the elastomeric ring, the outer ring being generally Z-shaped in cross-section. The inner sealing ring comprises an axially extending circular cylindrical portion, the cylindrical portion comprising an outer cylindrical wall, an inner cylindrical wall, and a rear radial edge, a radially extending planar ring portion coupled to the cylindrical portion, the ring portion comprising a seal side planar wall, an opposing planar wall, and an outer cylindrical edge, and a sealing surface defined by the seal side planar wall. The outer ring comprises an axially extending second circular cylindrical portion, the second cylindrical portion comprising a second outer cylindrical wall, a second inner cylindrical wall, a front end, and a rear end, a seating flange extending radially outward from the front end of the second cylindrical portion, the seating flange comprising a second seal side planar wall, a housing side planar wall, and a second outer cylindrical edge, and a backing flange extending radially inward from the rear end of the second cylindrical portion, the backing flange comprising a second seal side planar wall, a housing side planar wall, and a second outer cylindrical edge.

In an alternative embodiment of the invention, a wheel assembly comprises a rotatable wheel hub, a shaft, at least one bearing assembly positioned about the shaft and configured to define rotation movement of the wheel hub about the shaft, and a face seal comprising a first half and a second half. Each half of the face seal comprises an inner sealing ring, the inner sealing ring being generally L-shaped in cross-section, an elastomer ring disposed over the inner sealing ring, and an outer ring disposed over the elastomeric ring, the outer ring being generally Z-shaped in cross-section. The inner sealing ring comprises an axially extending circular cylindrical portion, the cylindrical portion comprising an outer cylindrical wall, an inner cylindrical wall, and a rear radial edge, a radially extending planar ring portion coupled to the cylindrical portion, the ring portion comprising a seal side planar wall, an opposing planar wall, and an outer cylindrical edge, and a sealing surface defined by the seal side planar wall. The outer ring comprises an axially extending second circular cylindrical portion, the second cylindrical portion comprising a second outer cylindrical wall, a second inner cylindrical wall, a front end, and a rear end, a seating flange extending radially outward from the front end of the second cylindrical portion, the seating flange comprising a second seal side planar wall, a housing side planar wall, and a second outer cylindrical edge, and a backing flange extending radially inward from the rear end of the second cylindrical portion, the backing flange comprising a second seal side planar wall, a housing side planar wall, and a second outer cylindrical edge.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures:

FIG. 3 illustrates a front view of the face seal of FIG. 1;

FIG. 4A illustrates an view of the face seal of FIG. 1 installed in a wheel assembly;

DETAILED DESCRIPTION OF ILLUSTRATIVE EMBODIMENTS

Embodiments of the present invention provide for a face seal and bearing assembly designed to improve the reliability of rubber-track vehicle wheel assemblies. The design addresses the above-identified issues of the prior art, such as U.S. Pat. No. 7,370,865, the contents of which is hereby incorporated by reference in its entirety. In particular, the present design includes a metal ring to the outer diameter (OD) of the seal. A flange is included on the OD of the metal ring to provide positive depth control at installation. A second flange is included in the inner diameter (ID) of the metal ring, thereby providing a support surface for any seal face loads. These flanges may eliminate a need for a difference between face seal and bearing OD, thus allowing a relatively smaller seal diameter.

Figure 1:
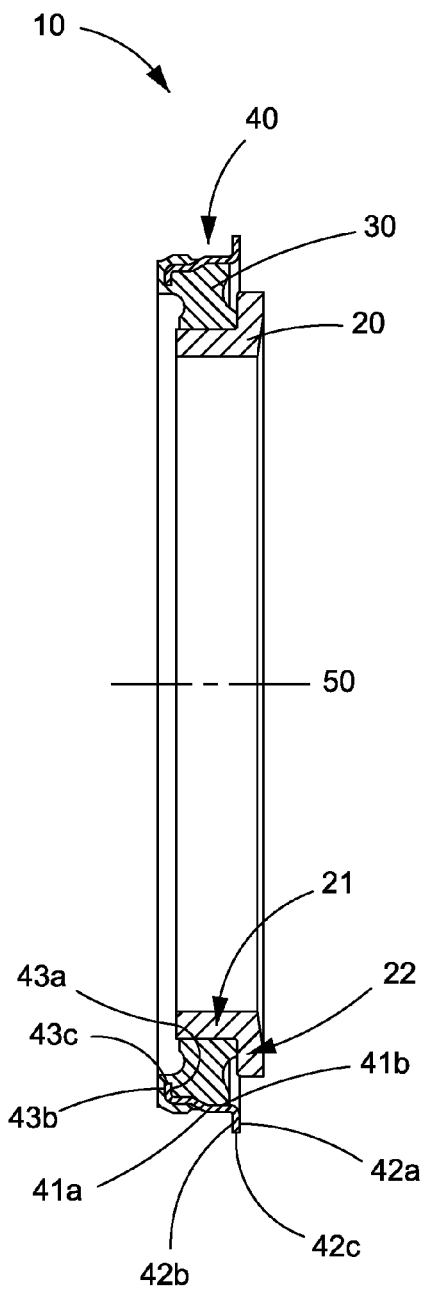
FIG. 1 illustrates a cross sectional view of an exemplary press-fit face seal in accordance with one embodiment of the present invention.
Figure 2:
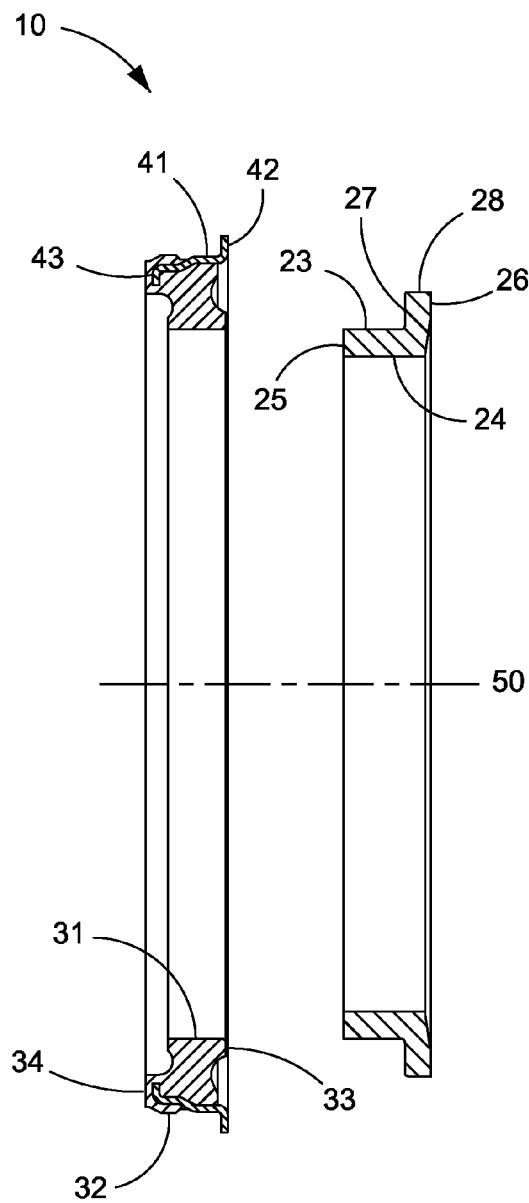
FIG. 2 illustrates an exploded view of the press-fit face seal of FIG. 1.

FIGS. 1 and 2 show a cross sectional view of an exemplary press-fit face seal in accordance with one embodiment of the present invention. FIG. 1 shows a cross sectional view of an exemplary press-fit face seal and FIG. 2 shows an exploded cross-sectional view of the face seal. As shown in FIGS. 1 and 2, the face seal 10 includes an inner sealing ring 20, an elastomeric ring 30, and an integrally bonded outer ring 40.

As shown, inner sealing ring 20 may be shaped as an L in cross-section. That is, inner sealing ring 20 is generally in the shape of an axially-extending right circular cylindrical portion 21 coupled to a radially extending planar ring portion 22. Cylindrical portion 21 preferably has an outer cylindrical wall 23, an inner cylindrical wall 24, and a rear radial edge 25. Outer cylindrical wall 23 and inner cylindrical wall 24 may be spaced apart a constant radial distance. Cylindrical portion 21 preferably has a substantially constant wall thickness measured both in an axial direction and in a circumferential direction.

Planar ring portion 22 of inner sealing ring 20 may be a generally planar disk having a seal side generally planar radial wall 26, an opposing planar wall 27 and an outer cylindrical edge 28. Seal side planar radial wall 26 defines a sealing surface that is configured to engage an identical mating sealing surface of an adjacent and facing face seal. This arrangement is illustrated in FIGS. 4A, 4B, 5, and 7, which illustrate two identical face seals 10, 10 that are shown in this face-to-face relationship.

Figure 7:
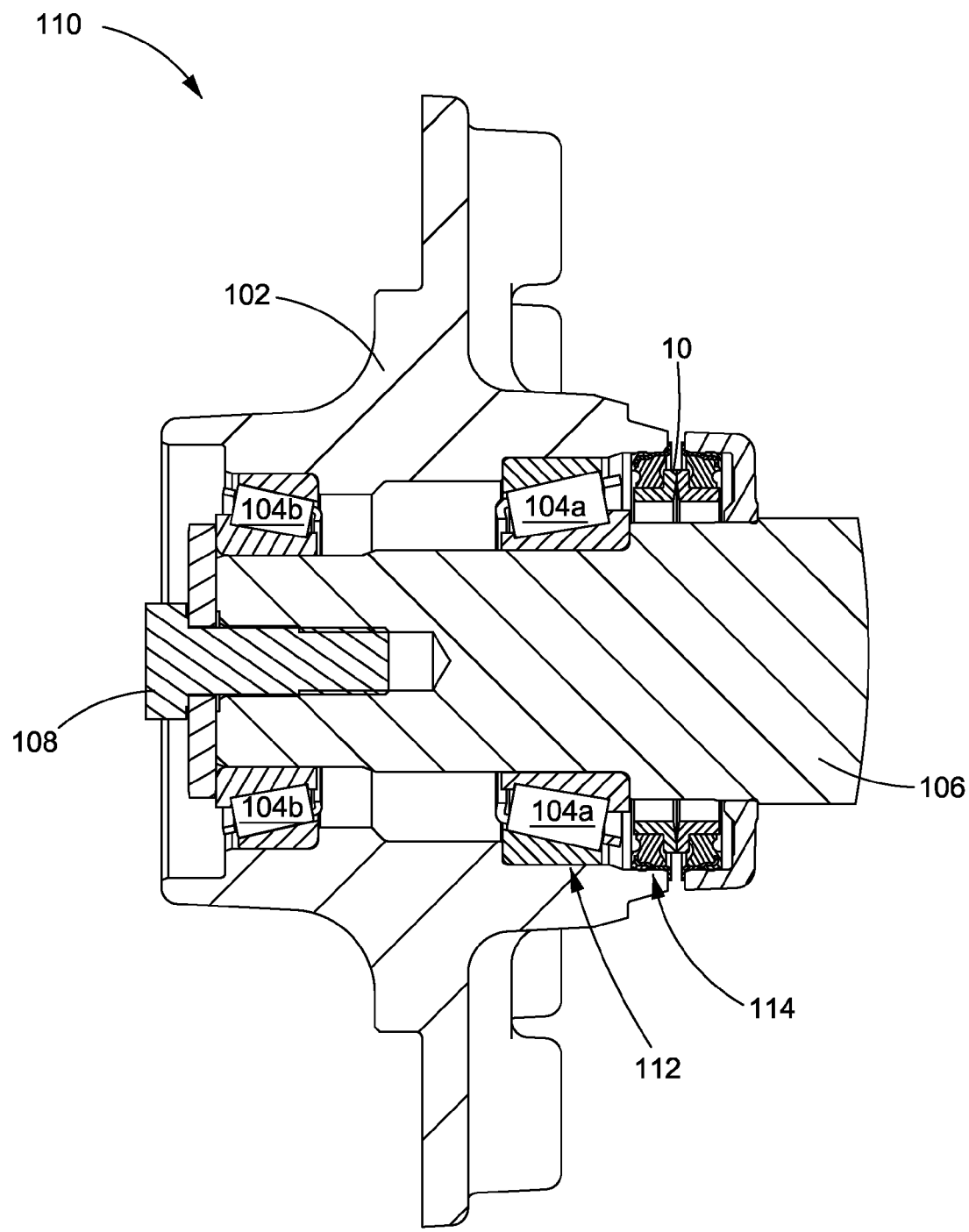
FIG. 7 illustrates an exemplary track wheel assembly in which face seal may be employed.

Seal side planar radial wall 26 of planar ring portion 22 of inner sealing ring 20 is substantially planar. However, when a pair of opposing face seals 10 is assembled into the wheel assembly 170 shown in FIG. 7, the radial walls 26 of each inner sealing ring 20 of each face seal 10 may deflect slightly in a known way to encourage the flow of lubricating oil in between the two opposing seal side radial walls 26. As a result, in operation the face seals 10 may only contact along an annulus disposed on the outer periphery of the radial walls 26. When compressed against an opposing face seal, such as shown in FIG. 7, the force between the two surfaces is preferably between 0.5 and 2.0 N per mm of circumference. Preferably, the inner sealing ring 20 is composed of an iron alloy, as is conventional.

Owing to the interference fit of the face seals into a wheel housing, a tool such as tool 100 as shown in U.S. Pat. No. 7,370,865 may be used to insert the face seal 10 into a right circular bore or cavity formed in the wheel housing.

The elastomeric ring 30 is provided to support the inner sealing ring 20 within a bore in which it is mounted. Elastomeric ring 30 provides a leak proof seal between inner sealing ring 20 and the bore. Elastomeric ring 30 may be flexible to compensate for slight misadjustment between the bore in which seal 10 is mounted, the seal itself, and an opposing, rotating seal. Elastomeric ring 30 is configured, among other things, to hold inner sealing ring 20 in proper position with respect to the relative axis of rotation (axis 50) of the face seal 10. The sealing surface of inner sealing ring 20 defines a plane that is perpendicular to the axis of rotation 50.

In the embodiment shown in FIGS. 1 and 2, inner cylindrical wall 31 of elastomeric ring 30 is not bonded to outer cylindrical wall 23 of inner sealing ring 20. Instead, the inner sealing ring 20 is inserted into elastomeric ring 30 and held therein by friction. Elastomeric ring 30 may extend radially outward and slightly leftward (in the manner of a conical section) in an axial direction away from inner sealing ring 20. The outer cylindrical wall 23 may be substantially smooth or featureless, i.e., there are no lips, ribbons or other features for holding elastomer ring 30 in place. See, for example, FIG. 4B. Conversely, the outer cylindrical wall may include one or more features 23a such as lips, ribbons or other similar features for holding elastomer ring 30 in place. See, for example, FIG. 4C.

Figure 5:
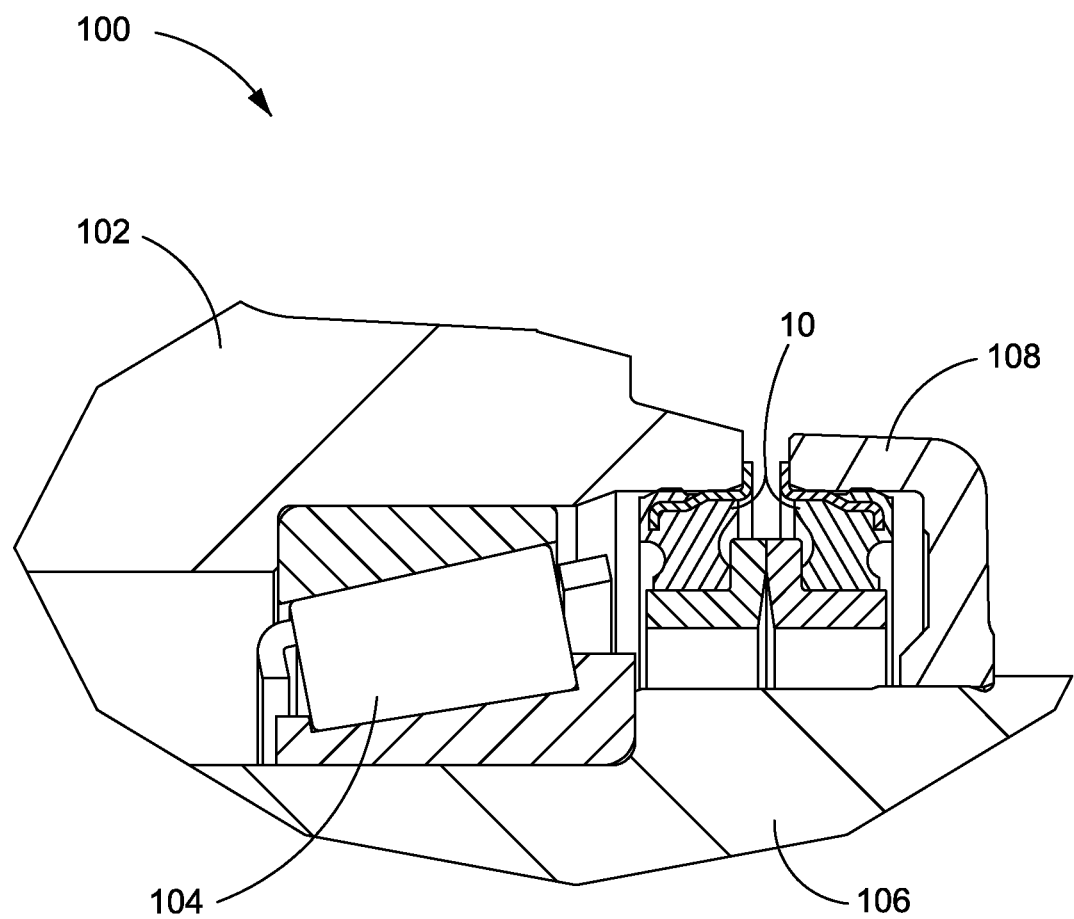
FIG. 5 is a cross sectional view of the face seal of FIG. 1 showing an exemplary seal and bearing configuration.

By forming elastomeric ring 30 as a substantially conical section, the elastomeric ring may extend axially away from the inner sealing ring 20 and, as shown in FIG. 5, may form a gap between a bottom of the bore when face seal 10 is installed. The gap may be large enough to permit inner sealing ring 20 to flex slightly into the bore without abutting a bottom of the bore even when it is compressed.

As shown in FIGS. 1 and 2 in cross-section, elastomeric ring 30 has the form substantially of a solid (or filled) trapezoid, preferably parallelogram, including an outer cylindrical wall 32 and a parallel inner cylindrical wall 31, as well as a seal-facing wall 33 and an opposite, parallel wall 34 facing the opposite direction of the seal-facing wall 33. Seal-facing wall 33 and the opposite, parallel wall 34 may be at a non-orthogonal angle from inner and outer cylindrical walls 31, 32 to form the filled generally trapezoidal shape of the elastomeric ring 30. The outer cylindrical wall 32 may be substantially smooth or featureless; i.e., there are no lips, ribbons or other features for holding the face seal in place during assembly. Conversely, the outer cylindrical wall 32 may include a series of features such as lips, ribbons or other features for holding the seal in place.

The elastomeric ring 30 may be configured to handle, among other things, high temperatures, high face pressures, and high face speeds. It is particularly suited for use on high-speed elastomeric tracked undercarriages for an agricultural tractor, such as the wheel assembly and tractor shown in FIGS. 7-9. Among other advantages, the elastomeric ring 30 of the preferred embodiment is believed to be more flexible at low temperature than currently used face seals because of the materials composing the ring—believed unique to interference-fit face seals. It is believed that as a result of this flexibility the coefficient of friction is substantially constant from high to low temperatures in comparison to the elastomeric rings of currently used face seals. At any rate, tests show that the elastomeric ring 30 according to a preferred embodiment does not spin in the housing at low temperature, thus preventing the accelerated wear of the elastomeric ring that is associated with spinning.

The composition of the elastomeric ring 30 may be a polymer having high temperature resistance. In particular, the polymer is preferably a fluoropolymer, preferably a fluoroelastomer, more preferably a dipolymer or terpolymer of vinylidene fluoride and hexafluoropropylene, or vinylidene fluoride, hexafluoropropylene and tetrafluoroethylene. These polymers are sold under the trade name VITON GLT by Dow-DuPont.

The elastomeric ring 30 may take a thermal set of less than about 40%, even more preferably less than about 30%, and even more preferably less than about 20% using the ASTM D 395 standard test procedure at 200 degrees C. for 22 hours. "ASTM" refers to the American Society of Testing Materials, which maintains the standard. Fluoropolymers such as VITON provide this resistance to thermosetting.

The elastomeric ring 30 may also have a low temperature retraction (a "TR10") of less than about 0 degrees C., more preferably less than about −10 degrees C. and even more preferably less than about −20 degrees C. Elastomers that are rigid at low temperatures are particularly benefited when installed with the force fit described herein. This low temperature retraction is measured per ASTM D 1329.

As shown in FIGS. 1 and 2, an outer ring 40 may be disposed over the elastomeric ring. Outer ring 40 may be shaped generally as a Z in cross-section. That is, outer ring 40 is generally in the shape of an axially-extending second axially extending circular cylindrical portion 41 coupled to an outward radially extending seating flange 42 and an inward radially extending backing flange 43.

As shown in FIGS. 1 and 2, the circular cylindrical portion 41 includes a second outer cylindrical wall 41a and an inner cylindrical wall 41b, a front end where the circular cylindrical portion abuts the seating flange, and a back end where the circular cylindrical portion abuts the backing flange 43. The seating flange 42 may extend radially outward from the front end of the circular cylindrical portion 41. The seating flange 42 may provide an OD for the face seal 10 to be used in providing positive depth control during installation of the face seal. The seating flange 42 may include a seal side planar wall 42a, a housing side planar wall 42b, and a second outer cylindrical edge 42c. The backing flange 43 extends radially inward from the rear end of the circular cylindrical portion 41. The backing flange 43 includes a seal side planar wall 43a, a housing side planar wall 43b, and an outer cylindrical edge 43c. Preferably, the outer ring 40 is composed of an iron alloy, as is conventional.

FIG. 3 shows a front view of the face seal 10. As used herein, "front" refers to the side of the face seal having the sealing surface. As shown in FIG. 3, seal side planar wall 26 defines an ID of the face seal 10. Conversely, seating flange 42 defines an OD of the face seal. Elastomeric ring 30 may be bonded to both the inner sealing ring 20 and the outer ring 40 such that the face seal 10 forms a single, removable component.

Figure 4C:
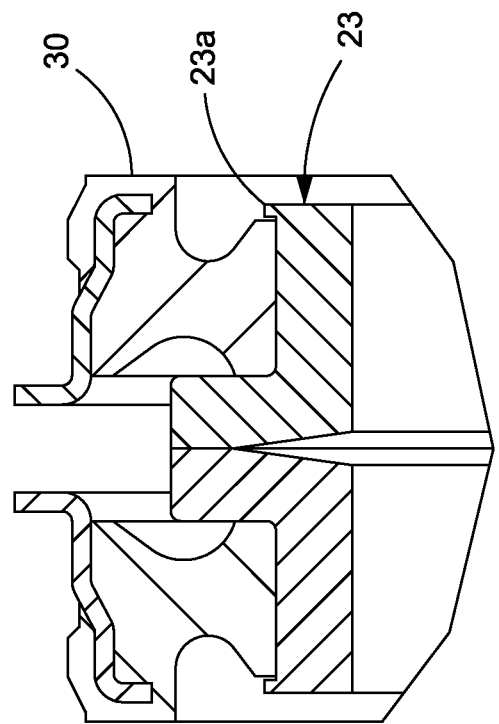
FIG. 4C illustrates an alternative inner sealing ring.
Figure 4B:
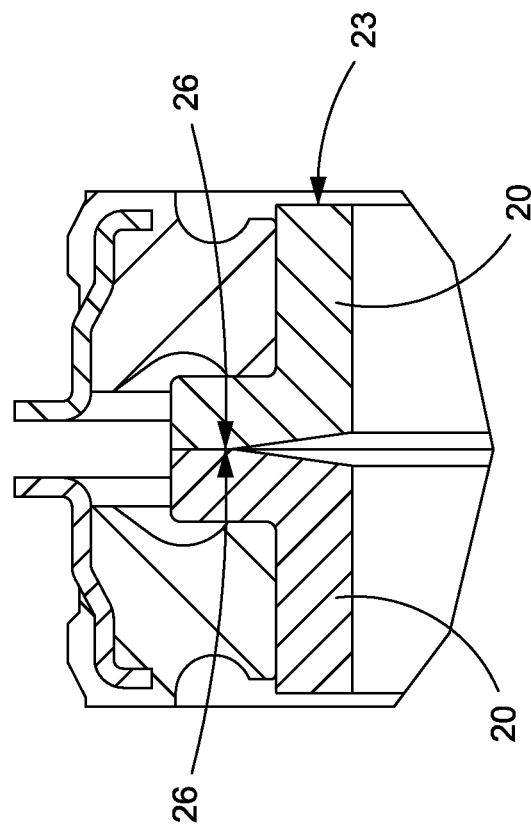
FIG. 4B illustrates a partial detailed view of the face seal of FIG. 4A.

FIGS. 4A and 4B illustrate an exemplary set of installed face seals 10. When installed, each seal side planar radial wall 26 of planar ring portion 22 of inner sealing ring 20 is substantially planar. As discussed above, when a pair of opposing face seals 10 is assembled, the radial walls 26 of each inner sealing ring 20 of each face seal 10 may deflect slightly in a known way to encourage the flow of lubricating oil in between the two opposing seal side radial walls 26. As a result, in operation the face seals 10 may only contact along an annulus disposed on the outer periphery of the radial walls 26.

FIG. 5 illustrates an exemplary face seal and bearing configuration 100. The configuration 100 may include a rotating wheel hub 102 mounted about a series of bearing assemblies 104 around a shaft 106. The shaft 106 may be stationary and may include a seal 108 into which a face seal 10 may be fitted. Similarly, the wheel hub 102 may define an opening or bore into which a second face seal 10 may be fitted. Thus, when the wheel hub is mounted onto the shaft 106, the face seals 10, 10 abut and form a seal, thereby preventing dirt or other debris from reaching the shaft 106, bearing assemblies 104 and other critical components of the configuration 100.

Figure 6C:
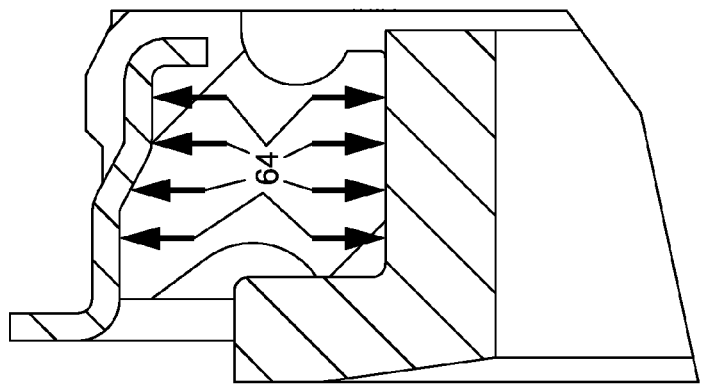
FIGS. 6A-6C illustrate various forces being applied to an installed face seal such as that shown in FIG. 4A.
Figure 6B:
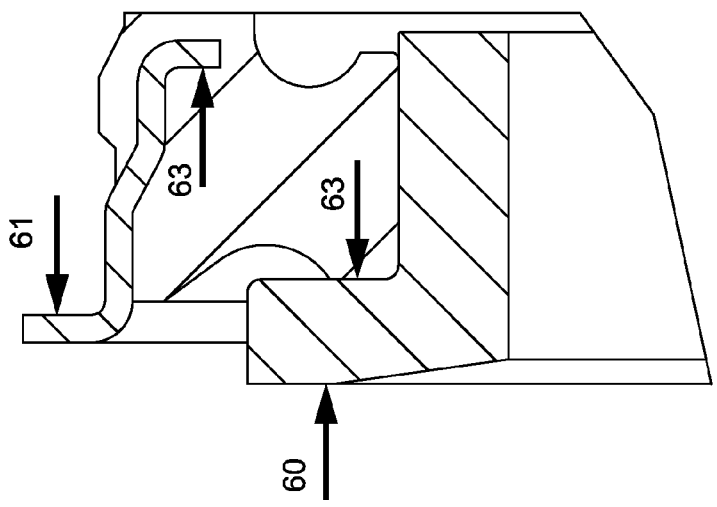
Figure 6A:
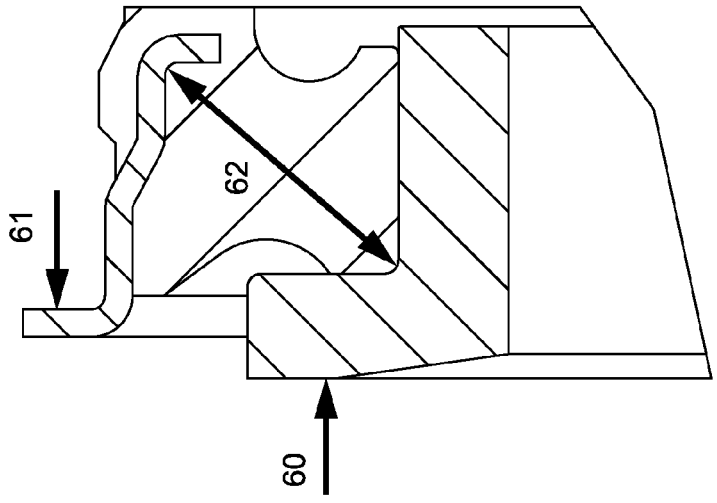

FIGS. 6A-6C illustrate an exemplary set of views of the forces that may be applied to a face seal 10 during normal operation of a track-wheeled vehicle. FIG. 6A illustrates a face load force 60 applied to face seal 10 by the wheel, a reaction force 61 applied against the wheel by the face seal, and an internal load resultant force 62 applied throughout the elastomeric ring 30 resulting from the face load force and the reaction force. FIG. 6B illustrates various axial forces acting on the face seal 10, including face load force 60, reaction force 61, and a plurality of internal axial forces 63. Similarly, FIG. 6C shows a plurality of internal radial forces 64 acting on the face seal 10. As shown in each view of FIGS. 6A-6C, the arrangement of the components as discussed above in FIGS. 1 and 2 provides for a means to absorb and distribute the forces throughout the elastomeric ring 30 such that the inner sealing ring 20 maintains a seal between two face seals 10.

FIG. 7 illustrates a wheel assembly 110 including a rotating wheel hub 102 mounted for rotation about a shaft 106. Multiple bearing assemblies 104 may be included. For example, an inboard bearing assembly 104a and an outboard bearing assembly 104b may surround the shaft 106 and define the rotational movement of the wheel hub 102. The wheel assembly may include two face seals 10 as discussed above in regard to FIG. 5. Additional components such as bearing retaining hardware 108 may also be included as necessary.

As shown in FIG. 7, an OD 112 of the bearing assemblies 104 and an OD 114 of the face seals 10 are similar in size. By using the present face seal 10 (as described in detail above in regard to FIGS. 1 and 2), a smaller OD 114 may be used for the face seal, closer in size to that of the OD 112 of the bearing assemblies 104. Depending on the application and wheel size, the OD 112 and OD 114 may be equal in size. This reduces the problems associated with the prior art such as excessive heat produced by an oversized face seal while still reducing the reactive forces applied to the bearing assemblies.

Figure 8:
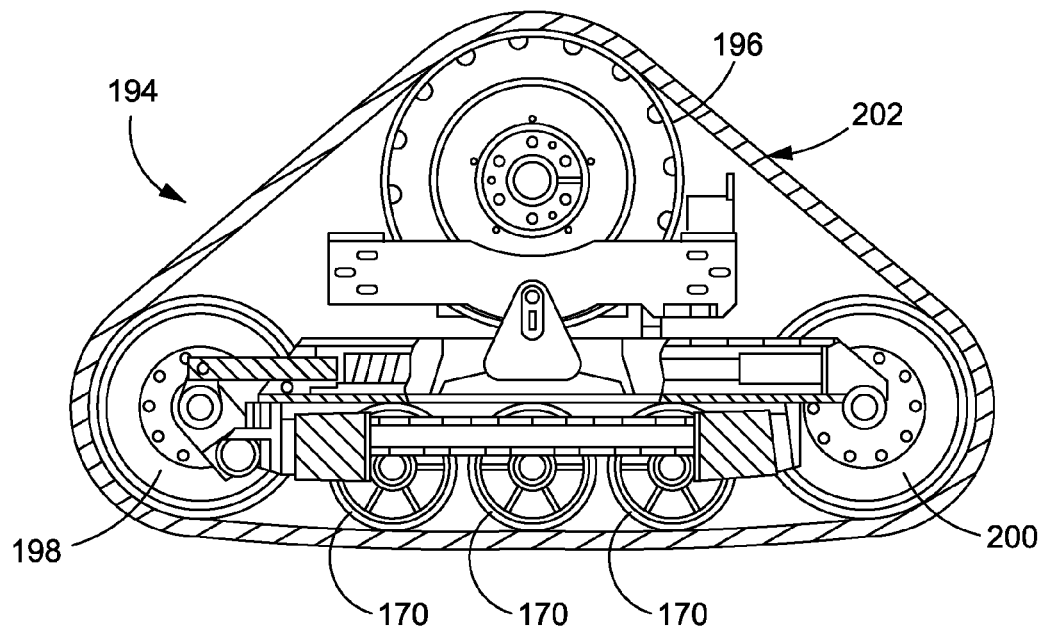
FIG. 8 illustrates an exemplary track drive in which the face seal may be used.

FIG. 8 is a side view of an exemplary track drive 194. As shown, track drive 194 may include a drive wheel 196, fore and aft idler wheel pairs 198, 200, respectively, and a plurality of roller wheel pairs 170 (e.g., three shown). An endless reinforced synthetic rubber track 202 may extend around the periphery of these wheels 198, 200, and 170 and may be driven by drive wheel 196. Each of the wheels 198, 200, 170 may be supported via a track wheel assembly, as shown in FIG. 7.

Figure 9:
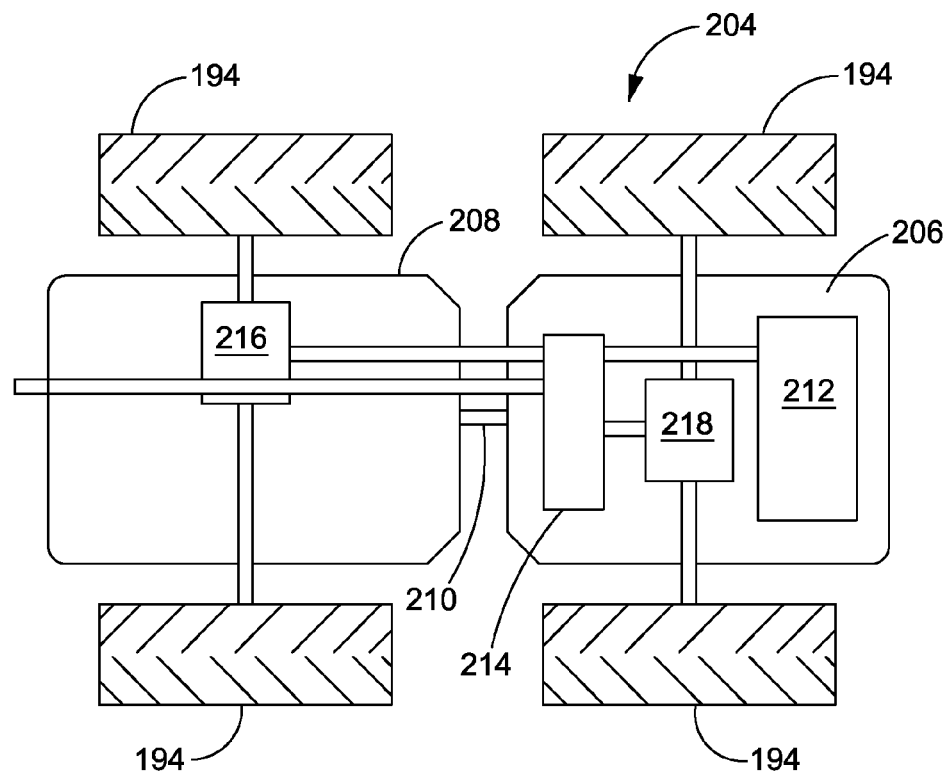
FIG. 9 illustrates an exemplary track drive agricultural machine in which the track drive of FIG. 8 may be used.

FIG. 9 shows a plan view of an exemplary track drive agricultural tractor 204 in which the press-fit face seal according to embodiments of the present invention may be used. As shown, track drive agricultural tractor 204 may include a front frame 206 and a rear frame 208 coupled together with an articulated coupling 210. As illustrated, tractor 204 has four track drives 194 disposed in fore-and-aft relationship, with two track drives on each of the two vehicle frames. One track drive extends from each side of front frame 206 and one track drive extends from each side of rear frame 208. An engine 212 may be fixed to front frame 206 and drives a transfer case 214. Transfer case 214, in turn, drives a rear differential 216 and front differential 218. Left front and right front track drives 194 are coupled to drive shafts extending from the left and right sides of the front differential 218. Left rear and right rear track drives 194 are coupled to drive shafts extending from the left and right sides of rear differential 216.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A face seal comprising a first annular half and a second annular half which together form the face seal, each half comprising:
   an inner sealing ring, the inner sealing ring being generally L-shaped in cross-section including
   an axially extending first circular cylindrical portion, the cylindrical portion comprising an outer cylindrical wall, an inner cylindrical wall, and a rear radial edge,
   a radially extending planar ring portion coupled to the first cylindrical portion, the ring portion comprising a seal side planar wall, an opposing planar wall, and an outer cylindrical edge, and
   a sealing surface defined by the seal side planar wall;
   an elastomeric ring disposed over the inner sealing ring, and
   an outer ring disposed over the elastomeric ring, the outer ring including
   an axially extending second circular cylindrical portion, comprising
   a first portion extending axially from the seating flange, the first portion in contact with an outer surface of the elastomeric ring;
   a second portion extending axially from the backing flange, the second portion embedded in the elastomeric ring; and
   a transition portion extending between and connecting the first portion and the second portion,
   the second cylindrical portion also comprising a second outer cylindrical wall, a second inner cylindrical wall, a front end, and a rear end,
   a seating flange extending radially outward from the front end of the second cylindrical portion, the seating flange comprising a second seal side planar wall, a housing side planar wall, and a second outer cylindrical edge, wherein the second seal side planar wall and the housing side planar wall are positioned perpendicularly relative to an axis of rotation and the housing side planar wall is positioned against an identically-oriented surface which is not a portion of the face seal, and wherein the second seal side planar wall, the housing side planar wall, and the second outer cylindrical edge are not embedded in or covered by the elastomeric ring, and
   a backing flange extending radially inward from the rear end of the second cylindrical portion, the backing flange comprising a second seal side planar wall, a housing side planar wall, and a second outer cylindrical edge, wherein the backing flange is positioned perpendicularly relative to the axis of rotation, the backing flange embedded in the elastomeric ring.

2. The face seal of claim 1, wherein the elastomeric ring comprises a third outer cylindrical wall and a parallel third inner cylindrical wall and a seal-facing wall, and an opposite, parallel wall, wherein the third outer cylindrical wall abuts the inner cylindrical wall of the inner sealing ring.

3. The face seal of claim 2, wherein the outer ring and the elastomeric ring are integrally bonded together.

4. The face seal of claim 1, wherein the backing flange is embedded in the elastomeric ring, and wherein a portion of the outer wall of the elastomeric ring is positioned about and extends a distance away from the second outer cylindrical edge of the backing flange in cross-section.

5. The face seal of claim 1, wherein the seating flange extends orthogonal with respect to the second cylindrical portion.

6. The face seal of claim 1, wherein the backing flange extends orthogonal with respect to the second cylindrical portion.

7. The face seal of claim 1, wherein each annular half is a mirrored half, and wherein the seal surface of each half is in spinning and sealing contact.

8. The face seal of claim 1, wherein the first portion is oriented substantially parallel to a longitudinal centerline axis of the face seal;
   the second portion is oriented substantially parallel to the longitudinal centerline axis of the face seal, the second portion being radially off-set from the first portion and radially closer to the longitudinal centerline axis of the face seal; and
   the transition portion further comprising a radially extending planar shoulder for contacting a corresponding radially extending planar shoulder on the elastomeric ring.

9. A wheel assembly comprising:
   a rotatable wheel hub;
   a shaft;
   at least one bearing assembly positioned about the shaft and configured to define rotation movement of the wheel hub about the shaft; and a face seal comprising a first annular half and a second annular half which together from the face seal, each half including
   an inner sealing ring, the inner sealing ring being generally L-shaped in cross section and including
   an axially extending first circular cylindrical portion, the first cylindrical portion comprising an outer cylindrical wall, an inner cylindrical wall, and a rear radial edge,
   a radially extending planar ring portion coupled to the cylindrical portion, the ring portion comprising a seal side planar wall, an opposing planar wall, and an outer cylindrical edge, and
   a sealing surface defined by the seal side planar wall; an elastomeric ring disposed over the sealing ring, and
   an outer ring disposed over the elastomeric ring, the outer ring and including
   an axially extending second circular cylindrical portion, comprising
   a first portion extending axially from the seating flange, the first portion in contact with an outer surface of the elastomeric ring;
   a second portion extending axially from the backing flange, the second portion embedded in the elastomeric ring; and
   a transition portion extending between and connecting the first portion and the second portion, the second cylindrical portion also comprising a second outer cylindrical wall, a second inner cylindrical wall, a front end, and a rear end, a seating flange extending radially outward from the front end of the second cylindrical portion, the seating flange comprising a second seal side planar wall, a housing side planar wall, and a second outer cylindrical edge, wherein the second seal side planar wall and the housing side planar wall are positioned perpendicularly relative to an axis of rotation and the housing side planar wall is positioned against an identically-oriented surface which is not a portion of the face seal, and wherein the second seal side planar wall, the housing side planar wall, and the second outer cylindrical edge are not embedded in or covered by the elastomeric ring, and a backing flange extending radially inward from the rear end of the second cylindrical portion, the backing flange comprising a second seal side planar wall, a housing side planar wall, and a second outer cylindrical edge, wherein the backing flange is positioned perpendicularly relative to the axis of rotation, the backing flange embedded in the elastomeric ring.

10. The wheel assembly of claim 9, wherein the elastomeric ring comprises a third outer cylindrical wall and a parallel third inner cylindrical wall; and a seal-facing wall and an opposite, parallel wall, wherein the third outer cylindrical wall abuts the inner cylindrical wall of the inner sealing ring.

11. The wheel assembly of claim 10, wherein the outer ring and the elastomeric ring are integrally bonded together.

12. The wheel assembly of claim 9, wherein the backing flange is embedded in the elastomeric ring, and wherein a portion of the outer wall of the elastomeric ring is positioned about and extends a distance away from the second outer cylindrical edge of the backing flange in cross-section.

13. The wheel assembly of claim 9, wherein the seating flange extends orthogonal with respect to the second cylindrical portion.

14. The wheel assembly of claim 9, wherein the backing flange extends orthogonal with respect to the second cylindrical portion.

15. The wheel assembly of claim 9, wherein each half of the face seal is a mirrored half, and wherein the seal surface of each half is in spinning and sealing contact.

16. The wheel assembly of claim 9, wherein the first portion is oriented substantially parallel to a longitudinal centerline axis of the face seal;

the second portion is oriented substantially parallel to the longitudinal centerline axis of the face seal, the second portion being radially off-set from the first portion and radially closer to the longitudinal centerline axis of the face seal; and the transition portion further comprising a radially extending planar shoulder for contacting a corresponding radially extending planar shoulder on the elastomeric ring.

17. The wheel assembly of claim 9, wherein the first half of the face seal is configured to fit within a bore defined by the wheel hub, and the second half of the face seal is configured to fit within a seal on the shaft.

18. The wheel assembly of claim 17, wherein the face seal is configured to reduce reaction forces produced during movement of the wheel hub on at least one bearing assembly.

* * * * *